United States Patent Office 3,305,304
Patented Feb. 21, 1967

3,305,304
PURIFICATION OF PHOSPHORUS-CONTAINING SOLUTIONS
John A. Peterson, Niagara Falls, N.Y., assignor to Hooker Chemical Corporation, Niagara Falls, N.Y., a corporation of New York
No Drawing. Filed Nov. 23, 1962, Ser. No. 239,803
13 Claims. (Cl. 23—107)

This invention relates to the purification of phosphorus-containing solutions and more particularly it relates to a process for removing silicon impurities from phosphorus-containing solutions.

In the manufacture of alkali metal phosphates, such as sodium phosphate, the solutions from which the alkali metal phosphates are crystallized frequently contain silicon values. In order to avoid contamination of the final sodium phosphate product obtained these silicon values should be removed from the solution prior to crystallization of the phosphate. To do this easily and economically, the silicon values must be in a form in which they can be readily removed from the solution.

In this regard, it is obvious that the simplest way to remove the silicon values is by precipitating them out of the solution, generally as a hydrous silica. Precipitation is effected by heating the phosphate solution. Difficulties have heretofore been encountered, however, in obtaining such a precipitate in a form which can be easily and rapidly removed from the solution.

It is, therefore, an object of the present invention to provide a process wherein a substantially pure alkali metal phosphate is recovered from a phosphate-containing solution containing silicon impurities.

A further object of the present invention is to provide a process wherein silicon impurities are rapidly and easily removed from a solution containing an alkali metal phosphate.

These and other objects will become apparent to those skilled in the art from the description of the invention which follows.

According to the method of the present invention, an aqueous solution of an alkali metal phosphate containing silicon values is treated by adjusting the pH of the solution to within the range of about 8.0 to 9.0, and heating the thus-adjusted solution at an elevated temperature up to about the boiling point of the solution for a period of time sufficient to effect formation and substantially complete coagulation of a precipitate of hydrous silica in the solution. This hydrous silica precipitate may then be removed from the solution in any convenient manner, as for example, by centrifuging or filtration. After removal of the silicon impurities, the alkali metal phosphates may be recovered from the solution in any convenient manner. Where appreciable quantities of other undesirable impurities are also present in the solution, the solution may be subjected to additional treating steps to remove these impurities before the alkali metal phosphate is recovered.

It is to be understood, that as used in the specification and claims, the term "alkali metal" is intended to refer to sodium, potassium, lithium, rubidium and cesium. Of these, because of its low cost and ready availability, the preferred alkali metal is sodium. Accordingly, hereinafter, primary reference will be made to sodium and its compounds, as the preferred alkali metal but should be considered as applicable to the other alkali metals, too.

The solutions treated in accordance with the method of the present invention may be any aqueous alkali metal phosphate solution which contains silicon values as impurities. For example, such solutions may be obtained from the so-called "leached zone" ore, or from the treatment of ferrophosphorus. In the first instance, the "leached-zone" ore, which is an aluminum phosphate mineral, is leached with a solution of caustic soda so as to form an aqueous alkali metal phosphate solution containing silicon impurities. In the second instance, ferrophosphorus, which is an iron phosphide composition corresponding roughly to a mixture of $Fe_2P$ and FeP, is sintered in an oxidizing atmosphere with an alkaline material such as sodium carbonate. The sintered product is then leached with water so as to obtain an aqueous alkali metal phosphate solution containing silicon impurities. These solutions are exemplary of those which may be treated in accordance with the method of the present invention. It is to be understood that other similar alkali metal phosphate solutions containing silicon impurities may also be treated.

More specifically, in the practice of the present invention, an aqueous solution of an alkali metal phosphate, such as sodium phosphate, containing silicon impurities, generally in the form of sodium silicates, is treated so as to adjust the pH within the range of about 8.0 to about 9.0, a pH within the range of about 8.2 to about 8.5 being preferred. The means by which this pH adjustment is effected will, of course, depend upon the initial pH of the sodium phosphate solution. Where the solution is on the acid side of pH 8, as for example when the solution has an $Na_2O$ to $P_2O_5$ ratio corresponding to that of sodium tripolyphosphate, it will be necessary to add an alkaline material, such as sodium hydroxide or sodium carbonate to the solution in order to obtain a pH within the desired range. In such instances, both prior and during the pH adjustment, the solutions should be handled in a manner which will prevent or at least delay, precipitation of the hydrous silica, until the desired pH range is reached. For instance, until the desired pH is obtained, the temperature of the solution should be substantially under about 80° C. Where precipitation occurs before the desired pH range is reached, the precipitate is often substantially unfilterable and may not be converted to a filterable form even when the pH is raised to within the range of about 8.0 to about 9.0.

Generally, however, the sodium phosphate solutions being treated are on the alkaline side of pH 8, particularly where the solutions have been obtained from leached-zone ore or from ferrophosphorus. In these cases, the pH adjustment may be made by adding a suitable acid, such as phosphoric acid to the sodium phosphate solution. Although any phosphoric acid may be used to adjust the pH of the solution to within the desired range, it is preferred that the more concentrated phosphoric acid solutions be used. One reason for this preference is that, as will be pointed out in more detail hereinafter, after the pH adjustment, the solution may be evaporated, so that the addition of large amounts of water to the solution is desirably avoided. Accordingly, it is generally preferred that a commercial phosphoric acid solution containing between about 75 to about 85 percent phosphoric acid be used to adjust the pH of the sodium phosphate solution.

After the pH of the sodium phosphate solution has been adjusted to within the desired range, the phosphorus concentration of the solution may be adjusted to within the range of about 7.0 to about 9.5 percent phosphorus by weight of the solution, a phosphorus concentration within the range of about 8.5 to about 9.0 percent by weight being specifically preferred. Although, this adjustment of phosphorus concentration is not essential to the present process, it is desirable, particularly where the sodium phosphate solution also contains vanadium impurities which are to be removed. Any suitable means of adjusting the phosphorus concentration may be used. Preferably, however, the sodium phosphate solution is evaporated until the desired phosphorus concentration is obtained.

Once the desired pH and phosphorus concentration is obtained in the solution, precipitation of the silicon values, generally as a hydrous silica, occurs. The temperature at which the solution is maintained during the adjustment of the pH and the phosphorus concentration may be varied within a wide range, as for example, from room temperature, i.e. 20° C., up to the boiling point of the solution except as provided hereinabove, with regard to solutions on the acid side of pH 8. During the time of the precipitation of the silica, however, the temperature of the solution should be maintained at an elevated temperature, considerably above room temperature. In this regard, it is to be noted that in order to obtain the hydrous silica in a readily filterable form, the filtrate is heated to a temperature in excess of about 80° C., and preferably within the range of about 90° C. up to the boiling point of the solution. Additionally, this elevated temperature should be maintained until the precipitation and coagulation of the silica is substantially complete. Generally, this period of time will be about 30 minutes. It has been found that where this solution temperature is not maintained during the precipitation of the silica, the precipitation of the silica is frequently very difficult to initiate and, additionally, the precipitate is in a slimy, substantially unfilterable form. When the temperature of the solution is maintained in excess of about 80° centigrade, however, precipitation of the silica begins substantially immediately and the form of the silica is either a bulky, flocculent solid, or a firm, non-slimy, hydrogel particle. In either of these later forms, the silica precipitate is readily filterable and filtration is very rapid.

When the precipitation and coagulation of the silica is complete, the silica precipitate may be removed from the solution in any convenient manner, as for example, by filtration, centrifuging or the like. Thereafter, the sodium phosphate solution may be subjected to further processing in order to obtain a solid sodium phosphate product. This processing may involve merely subjecting the solution to crystallization so as to obtain a solid sodium phosphate product or, if desired, phosphoric acid may be added to the solution so as to change the $Na_2O$ to $P_2O_5$ ratio in the solution and obtain a particular sodium phosphate, such as sodium tripolyphosphate. It is to be noted that where undesirable impurities, in addition to the silicon impurities are present in the sodium phosphate solution, such as vanadium impurities, the solution may be subjected to additional purification treatment so as to remove these impurities. In such instances, the hydrous silica precipitate may be left in the solution during the subsequent treating steps and then removed in any convenient manner when the additional purification steps have been completed. Whether or not the silica precipitate is removed prior to such additional purification treatment will, of course, depend upon the nature of the treatment. Where, for example, vanadium impurities are also contained in the solution, which are to be removed by precipitating the vanadium as a vanadium-phosphorus complex, it has been found that the presence of the hydrous silica precipitate in the solution is not detrimental to the vanadium removal treatment.

In summary, it is pointed out that in the practice of the present method, it is important that the pH of the alkali metal phosphate solution be adjusted to within the range of about 8.0 to about 9.0 prior to the precipitation of the silica impurities from the solution. Additionally, it is important that the temperature of the alkali metal phosphate solution, during the time of the silica precipitation, be in excess of about 80° C., and preferably within the range of about 90 to about 100° C. Where these conditions are not met, it is found that the silica preciptate which forms in the alkali metal phosphate solution is only removed from the solution with great difficulty, if it can be removed at all. When operating under the above prescribed conditions, however, the silicon impurities are easily precipitated in the alkali metal phosphate solution and the precipitate is in a form which is very readily removed from the solution.

In order that those skilled in the art may better understand the method of the present invention and the manner in which it may be practiced, the following specific examples are given. All parts are by weight and temperatures are in degrees centigrade, unless otherwise stated.

Example 1

892 parts by weight of a finely-ground ferrophosphorus (200 mesh) containing 23 percent by weight phosphorus is mixed with 1160 parts by weight of soda ash. This amount of soda ash is sufficient to provide a 10 percent excess over the amount theoretically required to react with all of the phosphorus. This mixture is charged into the top of a multiple hearth direct-fired furnace, wherein it is brought to a temperature of about 950° C., in the presence of excess oxygen. When this mixture is substantially completely sintered, the sintered product is admixed with sufficient water to leach out all the $Na_3PO_4$, along with sodium carbonate, sodium vanadate and sodium silicate. The resulting slurry is about 43° Baumé. This slurry is then passed through a hydrocyclone wherein the dense insoluble materials, i.e., unreacted ferrophosphorus, magnetite and other iron oxides, are separated from the slurry. The supernatant slurry, at 35° Baumé, is then filtered in a pre-coated vacuum drum filter to remove the very fine insolubles. The resulting filtrate, at 23° Baumé, contained 185 parts by weight phosporus (90% of the phosphorus in the ferrophosphorus reaction charge) present as 980 parts by weight of $Na_3PO_4$, 110 parts by weight sodium carbonate, 4 parts by weight $SiO_2$, in the form of sodium silicate, and 0.74 part by weight vanadium, in the form of sodium vanadate. This represents a concentration of about 30 percent by weight trisodium phosphate and about 0.1 percent by weight $SiO_2$ in the solution.

Phosphoric acid, having a concentration of about 85 percent by weight, was added to the sodium phosphate solution obtained by the process as set forth hereinabove until the solution had a pH of 7. During the addition of the phosphoric acid, the solution was maintained at a temperature within the range of about 60 to 80° C. Thereafter, the temperature of the solution was increased to just about 80° centigrade. Hydrous silica was precipitated from the solution at pH 7 in the form of small gel-like particles. In attempting to remove this precipitate from this solution it was found to be very slimy in nature and the filtration is extremely slow.

Example 2

The procedure of Example 1 was repeated with the exception that the 85 percent phosphoric acid was added to the trisodium phosphate solution until a pH of about 8.2 was obtained. During the addition of the acid, the temperature of the solution was maintained substantially in the same range as in Example 1. After the addition of the acid was complete, the temperature of the solution was raised to just above 80 degrees centigrade and precipitation of the hydrous silica from the solution at pH 8.2 occurred almost immediately. This hydrous silica precipitate was in a flocculent form. In removing the precipitate from the solution by filtration, it was found that the filtration rate was extremely fast and the filter cake obtained was grainy in nature and did not become slimy even on compacting.

From a comparison of the results obtained in the above two examples, it is clearly seen that the pH of the phosphate-containing solution during the time of the silica precipitation is important. Where the pH is below about 8, a substantially unfilterable precipitate is obtained.

At a pH between 8.0 and 9.0, separation of the solution and precipitate by filtration is carried out quite easily and rapidly.

*Example 3*

In this example, an aqueous solution of trisodium phosphate was made up containing about 12 percent by weight trisodium phosphate and about one percent by weight $SiO_2$. This solution was maintained at a temperature within the range of 30 to 40 degrees centigrade while phosphoric acid having a concentration of about 85 percent by weight was added to the solution. When the addition of the phosphoric acid had preceded to a pH within the range of about 9.0 to about 9.5, large chunks of a soft, silica hydrogel were formed in the solution. Continued acid additions to get the pH within the desired range of 8.0 to 9.0 resulted in the entire mixture gelling up. It was, therefore, impossible to filter the solution and remove the silica.

*Example 4*

The procedure of Example 3 was repeated with the exception that the trisodium phosphate solution was maintained at a temperature within the range of about 90 to 100° centigrade as the concentrated phosphoric acid was added to the solution. The addition of the phosphoric acid was continued until a pH of 8.0 was obtained in the solution. Precipitation of the silica from the solution began at this later pH and the temperature of the solution was maintained within the range of about 90 to 100° C. until the precipitation and coagulation of the silica was completed. This precipitate was grainy, and non-slimy. In separating the precipitate from the solution it was found that the filtration was carried out at a very fast rate. To insure that the silica precipitation was substantially complete, the filtrate was further acidified to a pH of 6.7 with no additional silica precipitation.

*Example 5*

The procedure of Example 3 was repeated with the exception that the trisodium phosphate solution was maintained at a temperature within the range of 30 to 40 degrees centigrade during the addition of the 85 percent phosphoric acid until the pH of the solution was 8.0. As soon as this pH was obtained, the temperature of the mixture was raised to within the range of 95 to 100 degrees centigrade and maintained at this temperature until the precipitation and coagulation of the silica was complete. The silica precipitate thus-obtained was grainy and non-slimy and was removed from the solution by filtration at a very fast rate.

The solutions obtained in Examples 2, 4 and 5 were analyzed for silicon and found to contain only trace amounts of silicon.

The results obtained in Examples 3 through 5 clearly show that the temperature of the phosphate solution during the time of the silica precipitation is important. When the temperature used is substantially below about 80° C., separation of the silica precipitate from the solution is found to be extremly difficult if not impossible. In contrast, where the temperature of the solution during the time of silica precipitation is above 80° C., the silica precipitated in a form which was easily and rapidly removed from the solution by filtration. The results obtained in these examples as well as in Examples 1 and 2, clearly show the importance in the method of the present invention of maintaining the pH and the temperature of the phosphate solution within the prescribed ranges, in order to obtain a silica precipitate which can be rapidly removed from the solution.

While there have been described various embodiments of the invention, the methods described are not intended to be understood as limiting the scope of the invention, as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A process for purifying an aqueous alkali metal phosphate solution containing silicon values as impurities which comprises adjusting the pH of the alkali metal phosphate solution to within the range of about 8.0 to about 9.0 and maintaining the solution at an elevated temperature above about 80 degrees centigrade for a period of time sufficient to effect formation and coagulation of a precipitate of silicon values in the solution, the elevated temperature being maintained during the time in the process when the silicon values are being precipitated.

2. The process as claimed in claim 1 wherein the alkali metal phosphate solution has a pH on the alkaline side of 8 and is maintained at an elevated temperature above about 80 degrees centigrade during the entire process.

3. A process for purifying an aqueous sodium phosphate solution containing silicon values as impurities which comprises adjusting the pH of the sodium phosphate solution to within the range of about 8.0 to about 9.0 and maintaining the solution at an elevated temperature above about 80° C. for a period of time sufficient to effect formation and substantially complete coagulation of a precipitate of substantially all of the silicon values in the solution, the elevated temperature being maintained during that time in the process when the silicon values are being precipitated.

4. A process for purifying an aqueous alkali metal phosphate solution containing silicon values as impurities, which solution has a pH in excess of about 9.0, which comprises adding phosphoric acid to the alkali metal phosphate solution in an amount sufficient to adjust the pH of the solution to within the range of about 8.0 to about 9.0 and maintaining the solution at an elevated temperature above about 80° centigrade for a period of time sufficient to effect formation and substantially complete coagulation of a precipitate of substantially all of the silicon values in the solution, the elevated temperature being maintained from at least that time in the process when the addition of the phosphoric acid has been completed.

5. A process for purifying an aqueous alkali metal phosphate solution containing silicon values as impurities, which solution has a pH in excess of about 9.0, which comprises maintaining the solution at an elevated temperature above about 80 degrees centigrade, adding phosphoric acid to the solution in an amount sufficient to adjust the pH of the solution to within the range of about 8.0 to about 9.0 and maintaining the solution at the elevated temperature above about 80 degrees centigrade for a period of time sufficient to effect formation and substantially complete coagulation of a precipitate of substantially all of the silicon values in the solution.

6. The process as claimed in claim 4 wherein the amount of phosphoric acid added to the alkali metal phosphate solution is sufficient to adjust the pH to within the range of about 8.2 to about 8.5.

7. The process as claimed in claim 5 wherein the amount of phosphoric acid added to the alkali metal phosphate solution is sufficient to adjust the pH of the solution to within the range of about 8.2 to about 8.5.

8. The process as claimed in claim 6 wherein the alkali metal phosphate solution is a sodium phosphate solution.

9. The process as claimed in claim 7 wherein the alkali metal phosphate solution is a sodium phosphate solution.

10. A process for purifying an aqueous sodium phosphate solution containing silicon values as impurities, which solution has a pH in excess of about 9.0 which comprises maintaining the sodium phosphate solution at a temperature within the range of about 20 degrees centigrade up to the boiling point of the solution, adding phosphoric acid to the solution in an amount sufficient to adjust the pH of the solution to within the range of about 8.2 to about 8.5, and, thereafter, maintaining the solution at an elevated temperature above about 80 degrees centigrade for a period of time sufficient to effect formation and substantially complete coagulation of a precipitate of substantially all of the silicon values in the solution.

11. A process for purifying an aqueous sodium phosphate solution containing silicon values as impurities, which solution has a pH in excess of about 9.0, which comprises maintaining the solution at a temperature within the range of about 20 degrees centigrade to the boiling point of the solution, adding phosphoric acid to the solution in an amount sufficient to adjust the pH of the solution to within the range of about 8.0 to about 9.0, adjusting the phosphorus concentration in the solution to within the range of about 7.0 to about 9.5 percent phosphorus by weight of the solution, and maintaining the solution at an elevated temperature above about 80 degrees centigrade for a period of time sufficient to effect formation and substantially complete coagulation of a precipitate of substantially all of the silicon values in the solution, the elevated temperature above about 80° centigrade being maintained from at least that time in the process when the addition of the phosphoric acid to adjust the pH of the solution is completed.

12. The process as claimed in claim 11 wherein the pH of the solution is adjusted to within the range of about 8.2 to about 8.5 and the phosphorus concentration of the solution is adjusted to within the range of about 8.5 to about 9.0 percent phosphorus by weight of the solution.

13. The process as claimed in claim 12 wherein the phosphorus concentration of the solution is adjusted by evaporating the solution after adjustment of the pH has been completed.

References Cited by the Examiner

UNITED STATES PATENTS

| | | | |
|---|---|---|---|
| 279,445 | 6/1883 | Scheibler | 23—182 X |
| 1,812,761 | 9/1931 | Stevens et al. | 23—182 |
| 1,843,006 | 1/1932 | Stevens et al. | 23—182 |
| 1,891,293 | 12/1932 | Conway et al. | 23—106 |
| 2,654,655 | 10/1953 | Bonning et al. | 23—107 |
| 2,977,191 | 3/1961 | Pottier | 23—107 |
| 3,220,795 | 11/1965 | Peterson et al. | 23—107 |

OSCAR R. VERTIZ, *Primary Examiner.*

O. F. CRUTCHFIELD, *Assistant Examiner.*